(12) United States Patent
Deiters et al.

(10) Patent No.: US 10,823,245 B2
(45) Date of Patent: Nov. 3, 2020

(54) METHOD FOR THE PRETREATMENT OF A FRICTION LINING

(71) Applicant: Schaeffler Technologies AG & Co. KG, Herzogenaurach (DE)

(72) Inventors: Ralf Deiters, Reinsfeld (DE); Jochen Klee, Dueren (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 125 days.

(21) Appl. No.: 16/062,815

(22) PCT Filed: Nov. 30, 2016

(86) PCT No.: PCT/DE2016/200563
§ 371 (c)(1),
(2) Date: Jun. 15, 2018

(87) PCT Pub. No.: WO2017/101933
PCT Pub. Date: Jun. 22, 2017

(65) Prior Publication Data
US 2018/0372178 A1    Dec. 27, 2018

(51) Int. Cl.
| | | |
|---|---|---|
| F16D 69/02 | (2006.01) | |
| F16D 13/64 | (2006.01) | |
| B23K 26/352 | (2014.01) | |
| B23K 103/16 | (2006.01) | |
| F16D 69/00 | (2006.01) | |

(52) U.S. Cl.
CPC .......... F16D 69/026 (2013.01); B23K 26/352 (2015.10); F16D 13/64 (2013.01); B23K 2103/16 (2018.08); F16D 2069/004 (2013.01); F16D 2250/0038 (2013.01); F16D 2250/0053 (2013.01)

(58) Field of Classification Search
USPC .............................. 428/408; 427/372.2, 566
See application file for complete search history.

(56) References Cited

U.S. PATENT DOCUMENTS

2003/0079653 A1 * 5/2003 Okamura ............ C04B 35/6267
                                                          106/36
2008/0199641 A1    8/2008 Hasegawa et al.

FOREIGN PATENT DOCUMENTS

| CN | 101806329 | | 8/2010 |
|---|---|---|---|
| CN | 103671654 | | 3/2014 |
| DE | 10 2009 013 406 A1 | | 10/2009 |
| DE | 10 2012 017 502 | * | 12/2013 |
| EP | 1 319 860 | * | 6/2003 |
| FR | 3019767 A1 | | 10/2015 |

* cited by examiner

*Primary Examiner* — Archene A Turner

(74) *Attorney, Agent, or Firm* — Davidson, Davidson & Kappel, LLC

(57) ABSTRACT

A method for the pretreatment of a friction lining, in particular a dry clutch friction lining, comprising carbon compounds, includes modifying an effective surface of the friction lining by laser radiation in such a way that an oxidation layer containing carbon compounds is created. The pretreatment may be effected by means of laser radiation after hardening of the friction lining. The effective surface may be partially conditioned by means of laser radiation.

17 Claims, No Drawings

METHOD FOR THE PRETREATMENT OF A FRICTION LINING

The disclosure relates to a method for the pretreatment of a friction lining, in particular of a dry clutch friction lining, comprising carbon compounds.

BACKGROUND

German Laid-Open Application DE 10 2009 013 406 A1 discloses a method for the production of a friction lining, comprising the following steps: removing the friction lining from a hot press while still hot, introducing the still-hot friction lining into a cooling press.

SUMMARY OF THE INVENTION

It is an object of the disclosure to improve the properties of a friction lining, in particular of a dry clutch friction lining.

The object is achieved in the case of a method for the pretreatment of a friction lining, in particular of a dry clutch friction lining, comprising carbon compounds, by virtue of the fact that an effective surface of the friction lining is modified by laser radiation in such a way that an oxidation layer containing carbon compounds is created. The friction lining is preferably a dry clutch friction lining. A blank is preferably produced by winding. The blank preferably produced by winding is formed from a resin, into which the fiber and/or filler components are embedded. The resin is a phenolic resin/melamine resin, for example. The blank preferably contains at least one, several or each of the following components: rubber, glass fibers, organic fibers, copper. It is also optionally possible to use brass instead of copper. After a hot pressing process, the blank or the semifinished product or the friction lining is then hardened. Hardening is preferably performed in a furnace. A state of the friction lining in which it is essentially finished and hardened is referred to as the green state. In the installed state, the finished friction lining changes during a "running-in process". In studies and tests carried out in the context of the present disclosure, it has been found that the friction lining that is still in its green state exhibits unwanted fluctuations in the friction coefficient while being run in. The fluctuating behavior of the friction coefficient can also be referred to as the green behavior of the friction lining. By means of the pretreatment according to the disclosure of the friction lining by means of laser radiation while still in its green state it is possible to significantly improve the controllability of a system fitted with the pretreated friction lining, in particular a clutch system fitted with the pretreated dry clutch friction lining. Modification of the effective surface of the friction lining by means of laser radiation can also be referred to as conditioning of a friction surface of the frictionlining.

A preferred illustrative embodiment of the method is characterized in that the pretreatment is effected by means of laser radiation after hardening of the friction lining, in particular of the dry clutch friction lining. During hardening, the friction lining is exposed, preferably in a furnace, to relatively high temperatures, e.g. of more than two hundred degrees Celsius. After hardening, the friction lining is essentially finished and can be connected to a driving disk before it is mounted in a clutch. Thus, pretreatment by means of laser radiation represents an additional treatment after hardening.

Another preferred illustrative embodiment of the method is characterized in that the effective surface is partially conditioned by means of laser radiation. During conditioning by means of laser radiation, the effective surface or friction surface of the friction lining is swept or scanned with a laser beam. In this process, virtually any structures can be produced in the effective surface. However, laser radiation does not produce any recesses or grooves in the friction surface. By means of the laser radiation, a structured oxidation layer containing carbon compounds is created.

Another preferred illustrative embodiment of the method is characterized in that the effective surface is conditioned over the full area by means of laser radiation. "Over the full area" means that the entire surface, in particular the entire friction surface, of the friction lining is scanned or swept with the laser.

Another preferred illustrative embodiment of the method is characterized in that a friction surface of the friction lining is provided with a full-area oxidation layer by the pretreatment by means of laser radiation. "Full-area" means that the friction surface is continuously covered with the oxidation layer. The oxidation layer applied over the full area preferably has a substantially uniform layer thickness.

Another preferred illustrative embodiment of the method is characterized in that a friction surface of the friction lining is provided with a structured oxidation layer by the pretreatment by means of laser radiation. The oxidation layer can have virtually any structures desired. In this case, the structures of the oxidation layer are preferably of uniform configuration. The structured oxidation layer preferably does not have a uniform layer thickness.

Another preferred illustrative embodiment of the method is characterized in that the oxidation layer has a layer thickness which is significantly less than one millimeter. With such layer thicknesses, good results were obtained in tests and studies carried out in the context of the present disclosure.

Another preferred illustrative embodiment of the method is characterized in that the oxidation layer has a layer thickness of about one to three tenths of a millimeter. With this layer thickness, the best results were obtained in the tests and studies carried out in the context of the present disclosure.

Another preferred illustrative embodiment of the method is characterized in that the pretreatment or conditioning is effected by means of laser radiation before the friction lining is connected to a driving disk. The pretreated or conditioned friction lining can be secured on the driving disk by positive locking, in particular with the aid of riveted-joint elements.

The disclosure furthermore relates to a friction lining, in particular a dry clutch friction lining, comprising carbon compounds, which is pretreated in such a way in accordance with a method described above that an effective surface of the friction lining has an oxidation layer which contains carbon compounds. The pretreated friction lining has a significantly better behavior of the friction coefficient than a friction lining which is still in its green state.

DETAILED DESCRIPTION

Further advantages, features and details of the disclosure will become apparent from the following description, in which various illustrative embodiments are described in detail.

Dry clutch linings are composed of resin, rubber, fiber and filler components, for example. The dry clutch lining comprises eighteen percent resin, ten percent rubber, thirty percent glass fibers, thirteen percent organic fibers, seven percent copper, four percent cross-linking agents, three percent process auxiliaries and fifteen percent fillers, for example. Here, the percentage figures are given in percent by weight.

Clutch friction linings of this kind are used, in particular, in the friction clutches of motor vehicles. For this purpose, the clutch friction linings are firmly connected to a metallic carrier plate as a lining carrier or are riveted onto a clutch disk in order to allow torque transmission between an engine and a transmission in conjunction with a mating partner in a coupled state, or to disable torque transmission when the clutch is open.

A blank or preform is produced by winding, for example. The blank is held in a hot-press mold and pressed into a desired shape in a hot pressing process, wherein compression of the blank, which is also referred to as a pressed blank, takes place.

After hot pressing, the preform or pressed blank, which can also already be referred to as a friction lining, is then hardened. During hardening, the pressed blank or friction lining is exposed to a high temperature for many hours in a furnace.

The temperature during hardening is between two hundred and three hundred degrees Celsius, for example. Hardening takes twenty hours, for example. During hardening, cross-linking of the resin is completed in full. Moreover, volatile components are driven off during hardening.

After hardening, the friction lining is essentially finished. According to the method according to the disclosure, the hardened friction lining is then subjected to pretreatment or conditioning before it is secured on a driving disk.

During the pretreatment of the friction lining, a friction lining surface, in particular the friction surface of the friction lining, is modified in a controlled manner by means of laser radiation in such a way that an oxidation layer containing carbon compounds is created. Such an oxidation layer comprising carbon compounds arises during the normal operation of a friction system fitted with the friction lining by virtue of temperature effects due to frictional energy.

Before the formation of the oxidation layer comprising the carbon compounds, the friction lining is still in its green state, in which it exhibits pronounced fluctuations in the friction coefficient. These fluctuations in the friction coefficient are significantly reduced by the pretreatment or preconditioning or conditioning of the friction lining.

The laser treatment is carried out by means of a carbon laser, for example. In this case, the friction lining is irradiated over the surface in such a way with the laser in a final operation before fitting to the driving disk that the effective surface of the friction lining, which forms the friction surface, is modified. The oxidation layer comprising the carbon compounds is formed by scorching the effective surface.

The oxidation layer created by the pretreatment has a layer thickness of about one tenth of a millimeter. The layer thickness can be measured by means of a cross section through the pretreated friction lining.

What is claimed is:

1. A method for pretreating a dry friction lining comprising:
modifying an effective surface of the dry friction lining by laser radiation in such a way that an oxidation layer containing carbon compounds is created, the dry friction lining comprising organic fibers, copper or brass and fillers imbedded in a resin.

2. The method as claimed in claim 1 wherein the modifying of the effective surface of the friction lining by the laser radiation is a pretreatment performed after hardening of the friction lining.

3. The method as recited in claim 2 wherein the hardening of the friction lining includes exposed the friction lining to temperatures of more than two hundred degrees Celsius.

4. The method as recited in claim 1 wherein the effective surface is partially conditioned by the laser radiation.

5. The method as recited in claim 1 wherein the effective surface is conditioned over a full area by the laser radiation.

6. The method as recited in claim 1 wherein the effective surface is a friction surface of the friction lining provided with a full-area oxidation layer by the laser radiation.

7. The method as recited in claim 1 wherein the effective surface is a friction surface of the friction lining provided with a structured oxidation layer by the laser radiation.

8. The method as recited in claim 1 wherein the oxidation layer has a layer thickness less than one millimeter.

9. The method as recited in claim 8 wherein the oxidation layer has a layer thickness of one to three tenths of a millimeter.

10. The method as recited in claim 1 wherein the modifying of the effective surface of the friction lining by the laser radiation is a pretreatment or conditioning effected by the laser radiation before the friction lining is connected to a driving disk.

11. The method as recited in claim 1 further comprising hot pressing the blank; and then hardening the hot pressed blank, the modifying of the effective surface of the friction lining by the laser radiation being performed after the hardening.

12. The method as recited in claim 1 wherein the effective surface is a friction surface of the friction lining and the laser radiation is provided so as to not produce any recesses or grooves in the friction surface.

13. The method as recited in claim 1 further comprising, before the creating of the oxidation layer, hot pressing the blank; and then hardening the hot pressed blank.

14. The method as claimed in claim 1 wherein the dry friction lining includes rubber and glass fibers.

15. The method as claimed in claim 14 further comprising cross-linking agents and process auxiliaries.

16. A method of forming a dry friction lining comprising:
forming a blank including organic fibers, copper or brass and fillers embedded in resin;
creating an oxidation layer containing carbon compounds on the blank by modifying an effective surface of the blank by laser radiation.

17. A clutch dry friction lining comprising:
organic fibers, copper or brass and fillers embedded in resin; and
an effective surface having an oxidation layer containing carbon compounds.

* * * * *